Nov. 13, 1956 G. B. DOREY 2,770,332
PAWL RELEASING MEANS FOR A SLACK ADJUSTER
Filed Sept. 29, 1954 3 Sheets-Sheet 2

INVENTOR
George B. Dorey

Nov. 13, 1956  G. B. DOREY  2,770,332
PAWL RELEASING MEANS FOR A SLACK ADJUSTER
Filed Sept. 29, 1954  3 Sheets-Sheet 3
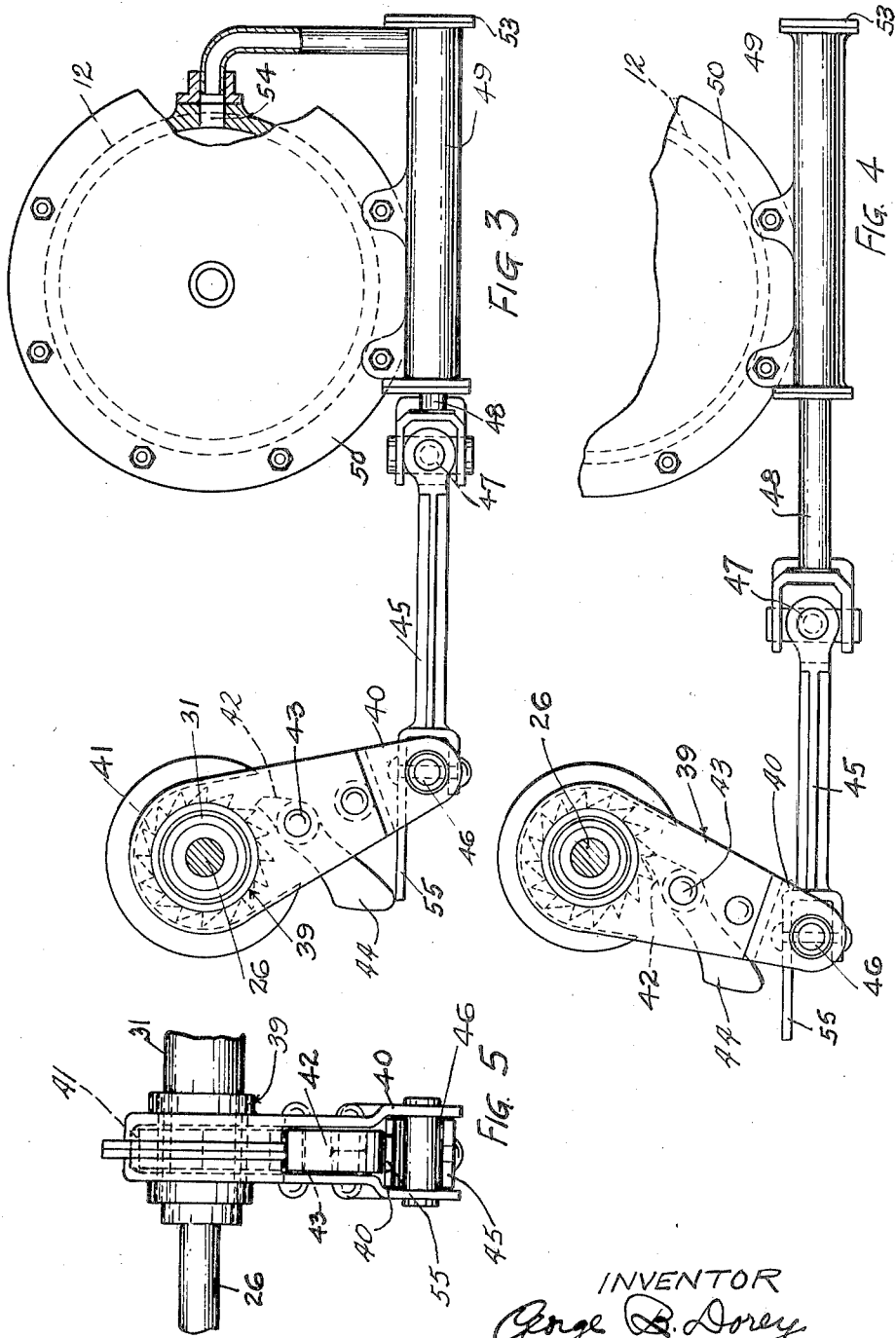
INVENTOR
George B. Dorey

United States Patent Office 2,770,332
Patented Nov. 13, 1956

2,770,332

PAWL RELEASING MEANS FOR A SLACK ADJUSTER

George B. Dorey, Westmount, Quebec, Canada

Application September 29, 1954, Serial No. 459,193

1 Claim. (Cl. 188—196)

The invention relates to an improved pawl releasing means for a slack adjuster such as employed in connection with a device for taking up slack in the brake system of a railway car and the like.

The invention particularly relates to that type of rotary take-up device located on a longitudinally and transversely movable connection and wherein rotation is effected through the medium of a pivoted lever having a pawl connection with a ratchet wheel fixedly mounted on the take-up device and wherein the lever is swung by movement of a link pivoted to the lever. A structure of the identified type having the take-up device carried by a floating connection precludes the employment of an abutment stationarily mounted on the car structure for engaging the pawl and releasing the same at the completion of the take-up movement of the lever and it is the object of the present invention to make use of the variation in the angle between the lever and the connecting link to engage the pawl and effect the release thereof.

The improvement contemplates the use of an extension on the connecting link which will engage with a weighted extension on the pawl and engage therewith to move the latter to release position as the movement of the connecting link and lever approaches the completion of the take-up travel.

For full comprehension of the invention reference may be had to the accompanying drawings wherein:

Figure 3 is a vertical end view of the structure shown in Fig. 2 as viewed from left to right and showing the pawl in declutched relation.

Figure 4 is a view similar to Fig. 3 except that the take-up operating link is shown in fully projected position with the pawl in clutched relation with the ratchet wheel.

Figure 5 is a side elevational view of the take-up operating lever assembly shown in Fig. 4 as viewed from left to right of the latter figure.

Figure 1:
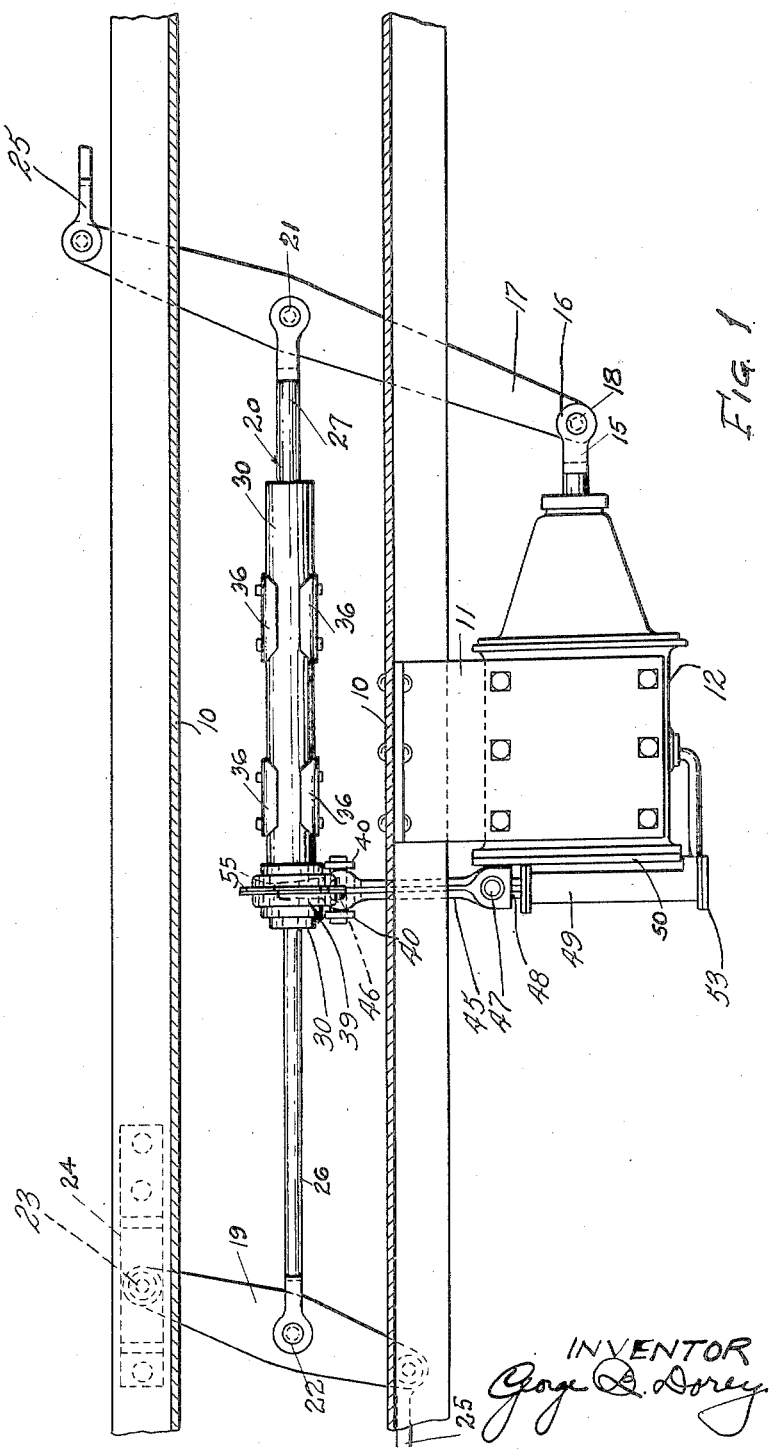
Figure 1 is a plan view of a portion of a railway car showing as much as necessary of the car structure to illustrate the application of the invention to the brake system of a railway car.
Figure 2:
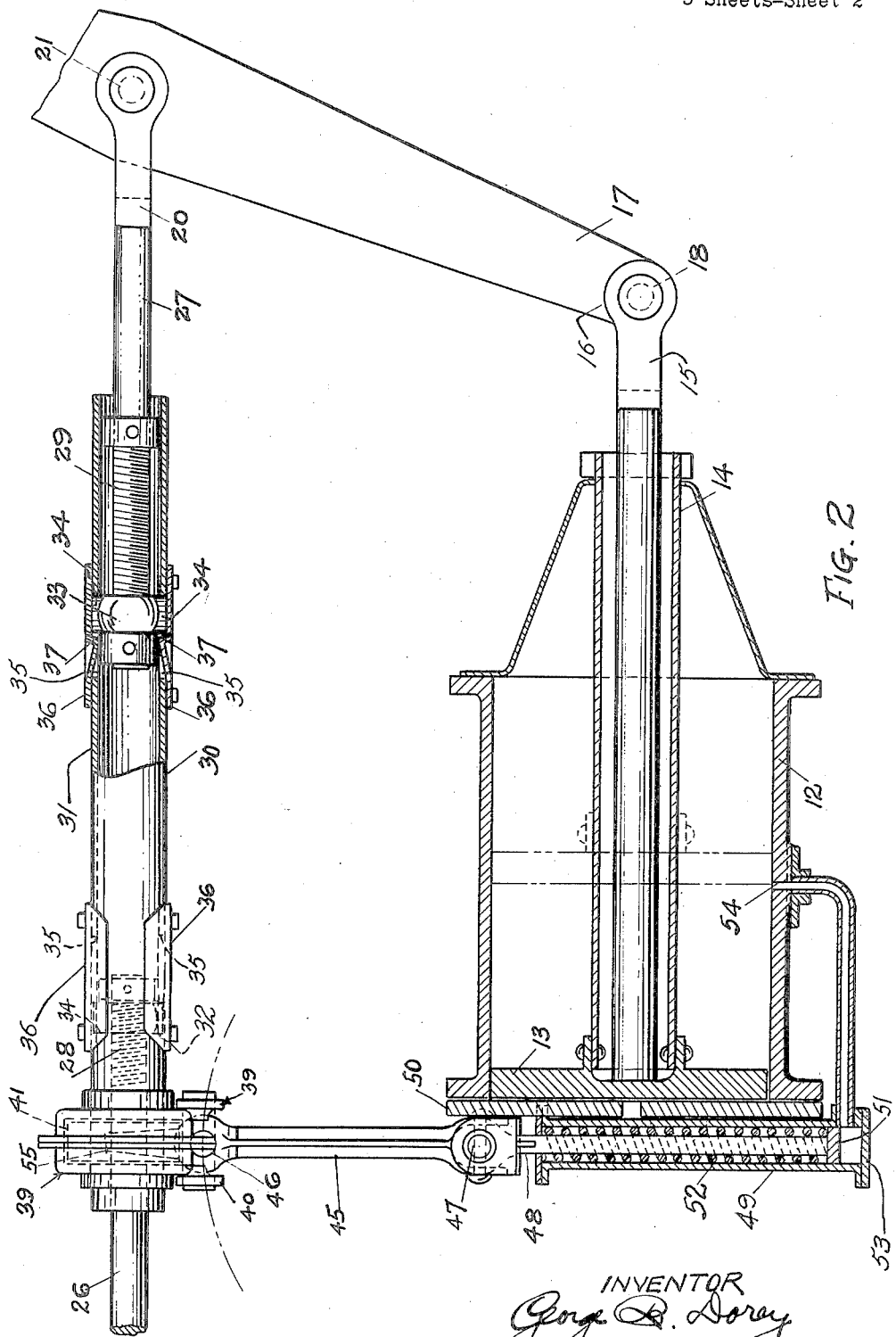
Figure 2 is a plan view of a portion of the structure shown in Fig. 1 on an enlarged scale with certain parts broken away to better illustrate the improvement.

In said drawing the car structure is indicated by center sills 10—10 and secured to one of said sills is a cylinder bracket 11 which in turn supports the main air brake operating cylinder 12. The cylinder 12 is fitted with a piston 13 having a hollow piston extension 14 within which is loosely mounted a push rod 15 which at its outer end is provided with a pair of jaws 16—16. The push rod 15 is pivotally connected with a brake lever 17 which is sandwiched between the jaws 16—16 and pivotally united therewith by a pintle 18.

The lever 17 is interconnected with another lever 19 through the medium of a center connection 20 which is connected at its respective ends by means of pintles 21 and 22. The lever 19 is fulcrumed on the car structure at 23 on a bracket 24 and the outer ends of lever 17 and 19 connect with top rods 25 which lead to the brake levers of the trucks (not shown) at the respective ends of the car.

The center connection 20 is divided lengthwise to provide two sections indicated at 26 and 27 respectively, the adjacent ends of said respective sections being screwthreaded to present right and left hand screwthreads as shown at 28 and 29 respectively.

The respective screwthreaded sections 28 and 29 are united by a rotatable take-up device 30 which includes a hollow tubular member 31 which is fitted with screwthreaded nuts 32 and 33 which respectively engage the screwthreaded ends 28 and 29 of the center connection. The nuts each include trunnion ends 34 which seat in slotted apertures 35 formed in the wall of the tube 31 and thus provide bearings for transmitting pulling strains on the center rod during application of the brake. Axial movement of the nuts in the slots is prevented by means of cover plates 36 which include abutments 37 which bear against the trunnions 34. Upon rotation of the take-up device in a take-up direction the tube 31 rotates in unison with the nuts 32 and 33 and the length of the connection is thereby altered.

Rotation of the take-up device is effected through the medium of a lever 39 which includes a pair of arms 40—40 disposed in spaced relation to accommodate a toothed ratchet wheel 41 therebetween, the latter being fixedly mounted on the tube 31. A clutch connection between the lever 39 and ratchet wheel 41 is effected through the medium of a pawl 42 pivotally mounted at 43 on the pair of arms 40—40. The pawl lever and ratchet wheel structure permits free swinging movement of the lever in declutched relation in a direction away from the brake cylinder and in clutched relation with the ratchet wheel when swung in the opposite direction. The pawl 42 is biased to clutching position by a weighted extension 44.

In this particular embodiment of the invention, actuation of the lever 39 is effected through the medium of a link 45 which is connected to the lever arm 39 by means of a universal joint 46. The link 45 in turn connects at 47 with a piston rod 48 which extends within a fluid operated cylinder 49, the latter being preferably secured to the rear head end 50 of the cylinder 12.

The piston rod 48 is formed at its inner end with a piston 51 and interposed between said piston 51 and forward end of the cylinder 49 is a returning spring 52. The piston 51 is moved forwardly on the admission of compressed air between the piston and rear head 53 of the cylinder, said air originating from a port 54 located in a side of the cylinder. The port 54, as will be understoood, being so located as to permit the flow of air therethrough from the main cylinder only after the travel of the piston 13 has exceeded the predetermined travel at which adjustment of the piston travel is required.

During the outward movement of the piston 51 under the influence of air pressure the spring 52 is compressed and the lever 39 is swung in declutched relation with the pawl freely ratchetting over the teeth of the ratchet wheel 41. Upon return movement of the piston 51 under the influence of the expanding spring 52 the lever swings in clutched relation with the ratchet wheel 41 thereby rotating the take-up device in a direction to take up slack. The link 45 is provided with an extension 55 which lies beneath the weighted extension 44 of the pawl 42 and as the said link 45 approaches the completion of the take-up movement and the lever 39 swings upwardly, the extension 55 makes contact with the extension 44 of the pawl 42 and swings the latter away from the ratchet wheel thus declutching the lever 39 and allowing free rotation of the take-up device, as will be noted by reference to Fig. 3.

The embodiment of the improved pawl releasing means is shown in connection with a fluid operated cylinder arrangement for moving the operating link but it will be understood that any type of motive power may be incorporated with the improved releasing means as the invention herein is confined to the means employed for releasing the pawl.

What I claim as new is:

In a slack adjuster for the brake leverage system of a railway car and the like having a take-up device operable by rotation thereof to vary the relation between certain parts of the system and thereby compensate for excessive slack in the brake parts and having a structure for rotating the take-up device to take up slack including a ratchet wheel fixedly mounted on the take-up device and a lever freely swingable on the take-up device, said lever having a pawl pivotally mounted thereon to provide a clutch connection between the ratchet wheel and lever when the latter is swung in a direction to take up slack and a declutched connection when swung in the opposite direction, said pawl being provided with a weighted extension to bias the pawl into engagement with the ratchet wheel, said structure including an operating link pivotally mounted on the lever for swinging the latter by movement of the link, the herein described improved means for releasing the pawl from the ratchet wheel at the completion of the take up movement and including an extension on the link lying beneath the weighted extension of the pawl and adapted to engage therewith at the completion of the take-up movement of the link to declutch the pawl from the ratchet wheel and allow free rotary movement of the take-up device in either direction.

References Cited in the file of this patent

UNITED STATES PATENTS

| | | |
|---|---|---|
| 487,636 | McKee | Dec. 6, 1892 |
| 696,521 | Wahlert | Apr. 1, 1902 |
| 1,505,938 | Adreon et al. | Aug. 26, 1924 |
| 2,277,137 | Neveu | Mar. 24, 1942 |